US010554241B2

(12) United States Patent
Jain et al.

(10) Patent No.: US 10,554,241 B2
(45) Date of Patent: *Feb. 4, 2020

(54) METHOD TO MITIGATE TRANSIENTS BASED ATTACKS ON KEY AGREEMENT SCHEMES OVER CONTROLLER AREA NETWORK

(71) Applicant: Robert Bosch GmbH, Stuttgart (DE)

(72) Inventors: Shalabh Jain, Pittsburgh, PA (US); Qian Wang, Greenbelt, MD (US); Md Tanvir Arafin, College Park, MD (US); Jorge Guajardo Merchan, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,779

(22) Filed: Mar. 8, 2018

(65) Prior Publication Data

US 2018/0262230 A1    Sep. 13, 2018

Related U.S. Application Data

(60) Provisional application No. 62/468,669, filed on Mar. 8, 2017.

(51) Int. Cl.
    *H04B 1/40*        (2015.01)
    *H04L 12/40*      (2006.01)
    (Continued)

(52) U.S. Cl.
    CPC .............. *H04B 1/40* (2013.01); *H04L 9/0838* (2013.01); *H04L 12/40* (2013.01); *H04L 63/1441* (2013.01); *H04L 2012/40215* (2013.01)

(58) Field of Classification Search
CPC .. H04B 5/02; H04B 1/40; H04L 12/40; H04L 12/40013; H04L 2012/40215
(Continued)

(56) References Cited

U.S. PATENT DOCUMENTS 4,598,286 A * 7/1986 Miller ................. H02J 13/0079
                                                        340/3.51
6,625,163 B1 * 9/2003 Shideler ................. G06F 13/376
                                                        370/230

(Continued)

OTHER PUBLICATIONS

Aciiçmez, Onur et al., "Predicting Secret Keys Via Branch Prediction," Springer Berlin Heidelberg, LNCS 4377, pp. 225-242, 2007 (18 pages).

(Continued)

*Primary Examiner* — Emmanuel Bayard
(74) *Attorney, Agent, or Firm* — Maginot, Moore & Beck LLP

(57) ABSTRACT

A method for operating at least one node connected to a shared communication medium reduces or eliminates the ability of an adversary node to identify the at least one node based on transient signal characteristics of a signal that the at least one node generates when transmitting a bit through the shared communication medium. The method includes adjusting, with a controller in a first node, an impedance of a variable impedance circuit in the first node to a first impedance level that the controller determines randomly, the variable impedance circuit in the first node being connected to an output of a transceiver in the first node and to a shared communication medium, and transmitting, with the transceiver, a first data bit through the shared communication medium with the variable impedance circuit producing the first impedance level.

19 Claims, 6 Drawing Sheets

(51) Int. Cl.
*H04L 9/08* (2006.01)
*H04L 29/06* (2006.01)

(58) Field of Classification Search
USPC .................................. 375/219–222, 257, 372
See application file for complete search history.

(56) References Cited

U.S. PATENT DOCUMENTS

| | | | |
|---|---|---|---|
| 2004/0043739 A1 | 3/2004 | Jordanger et al. | |
| 2005/0085211 A1* | 4/2005 | Welles, II | H04B 3/54 455/402 |
| 2009/0160479 A1 | 6/2009 | Lange et al. | |
| 2010/0198424 A1* | 8/2010 | Takehara | H01L 31/02021 700/298 |
| 2014/0056388 A1* | 2/2014 | Mori | H04B 1/10 375/340 |
| 2014/0136742 A1* | 5/2014 | Ooyabu | G06F 13/364 710/110 |
| 2014/0156899 A1 | 6/2014 | Kristiansen | |
| 2015/0067292 A1* | 3/2015 | Grunzke | G06F 13/1694 711/170 |
| 2015/0085411 A1 | 3/2015 | Yang et al. | |
| 2016/0036604 A1* | 2/2016 | Mori | H04L 25/0292 375/296 |
| 2016/0259385 A1 | 9/2016 | Tang | |
| 2017/0063354 A1* | 3/2017 | Chang | H03K 5/01 |
| 2017/0228010 A1* | 8/2017 | Tatapudi | G06F 1/3225 |
| 2017/0262394 A1* | 9/2017 | De Haas | G06F 13/4282 |
| 2017/0286351 A1* | 10/2017 | Williams | H04L 12/40 |
| 2018/0069874 A1* | 3/2018 | Saeki | B60R 16/023 |
| 2018/0262527 A1* | 9/2018 | Jain | G09C 1/00 |

OTHER PUBLICATIONS

Bernstein, Daniel J., "Cache-timing Attacks on AES," Apr. 2005 (37 pages).
Brumley, David et al., "Remote Timing Attacks are Practical," Proceedings of the 12th Conference on USENIX Security Symposium vol. 12, SSYM'03. USENIX Association, 2003.
Jain, Shalabh et al., "Physical Layer for Group Key Agreement for Automotive Controller Area Networks," In Proc. of Cryptographic Hardware and Embedded Systems (CHES 2016). Springer Berlin Heidelberg, 2016 (20 pages).
Kocher, Paul et al., "Differential Power Analysis," CRYPTO'99, LNCS 1666, pp. 388-397, 1999 (10 pages).
Kocher, Paul C., Timing Attacks on Implementations if Diffie-Hellman, RSA, DSS, and Other Systems, CRYPT0 96, LNCS 1109, pp. 104-113, 1996 (10 pages).
Microchip, Datasheet MCP2551, Technical Report, Microchip, retrieved from Internet: http://ww1.microchip.com/downloads/en/DeviceDoc/20001667G.pdf, accessed Nov. 11, 2016 (26 pages).
Müller, Andreas et al., "Plug-and-Secure Communication for CAN," CAN Newsletter, pp. 10-14, Dec. 2015 (5 pages).
Murvay, P.S. et al., "Source Identification Using Signal Characteristics in Controller Area Networks," IEEE Signal Processing Letters, vol. 21, Issue 4, pp. 395-399, Apr. 2014 (5 pages).
Cortes, C. et al., "Support-Vector Networks," Machine Learning, vol. 20, No. 3, pp. 273-297, 1995 (25 pages).
Hochreiter, Sepp et al., "Long Short-Term Memory," Neural Computation, vol. 9, No. 8, 1997 (32 pages).
Krizhevsky, Alex et al., "ImageNet Classification with Deep Convolutional Neural Networks," Neural Information Processing Systems, 2012 (9 pages).
Kruskal, Joseph B., "On the Shortest Spanning Subtree of a Graph and the Traveling Salesman Problem," Proceedings of the American Mathematical Society, vol. 7, No. 1, pp. 48-50, 1956 (3 pages).
Pettie, Seth et al., "An Optimal Minimum Spanning Tree Algorithm," Journal of the ACM, vol. 49, No. 1, 2002, pp. 16-34 (19 pages).
Prim, R.C., "Shortest Connection Networks and Some Generalizations," The Bell System Technical Journal, vol. 36, No. 6, pp. 1389-1401, 1957 (13 pages).
Sak, H. et al., "Long Short-Term Memory Recurrent Neural Network Architectures for Large Scale Acoustic Modeling," In Proceedings of Interspeech, pp. 338-342, 2014 (5 pages).
Simonyan, K. et al., "Very Deep Convolutional Networks for Large-Scale Image Recognition," Cornell University Library, submitted Sep. 2014, updated Apr. 2015, arXiv:1409.1556v6, retrieved from internet: https://arxiv.org/abs/1409.1556 (14 pages).
International Search Report and Written Opinion in corresponding PCT patent application No. PCT/US2018/021581 dated Aug. 14, 2018 (9 pages).

\* cited by examiner

METHOD TO MITIGATE TRANSIENTS BASED ATTACKS ON KEY AGREEMENT SCHEMES OVER CONTROLLER AREA NETWORK

CLAIM OF PRIORITY

This application claims the benefit of U.S. Provisional Application No. 62/468,669, which is entitled "Method to Mitigate Transients Based Attacks on Key Agreement Schemes over Controller Area Network," and was filed on Mar. 8, 2017, the entire contents of which are expressly incorporated herein by reference.

FIELD

This disclosure relates generally to the field of network communications and, more specifically, to systems and methods for secure communication using shared communication media.

BACKGROUND

The Controller Area Network (CAN) bus communications standard provides a robust communication interface that is used in a wide range of applications including, but not limited to, automobiles and other transportation vehicles, building automation, industrial systems, robotics, and other fields that require communication between embedded digital devices using a shared communication medium. Many CAN bus embodiments employ two electrically conductive wires, which are referred to as CAN-High (CANH) and CAN-Low (CANL), and electronic devices, which are referred to as "nodes" use the CANH and CANL wires as a shared communication medium to transmit and receive data using a standardized data frame format. The CAN bus typically utilizes of a pair of shielded or unshielded twisted pair of cables as the physical medium for signal transmission.

During normal operation, the nodes perform a bus arbitration process when one or more nodes wish to transmit a data frame to ensure that only one node actually transmits data on the CAN-High and CAN-Low lines at a time to provide reliable communication without "collisions" that occur when two or more nodes transmit simultaneously. In the CAN bus standard, when transmitting the dominant bit '0' on the bus, the output pins CANH and CANL are driven to different voltage levels, and the difference from CANH to CANL is the output of the CAN bus. Similarly, transmission of a recessive bit '1' occurs when CANH and CANL are not driven to higher relative voltage levels and will have similar voltage levels. Because the CAN bus is a shared communication medium, every node that is connected to a CAN bus can read each bit of data that is transmitted through the bus. This property of CAN bus presents problems when two nodes wish to communicate data privately that cannot be understood by other nodes that are connected to the bus.

Recent advancements to CAN bus implementations include configurations in which two nodes that are connected to the CAN bus transmit bits of data simultaneously (to produce a collision intentionally) to exchange cryptographic key data in a manner that prevents third party nodes from being able to determine which of the two transmitting nodes is actually transmitting information that forms a part of the cryptographic key. In one part of these key exchange techniques, two nodes simultaneously transmit a logical 1 and a logical 0 signal, followed by simultaneous transmission of the logical complement of the original bits from both nodes, which produces a summed voltage differential between the CANH and CANL wires that can be detected by each of the attached nodes. However, while all of the devices that are attached to the CAN bus can detect the transmission of a dominant bit (logical 0) through the CAN bus, because the two nodes transmit simultaneously the other nodes that are connected to the CAN bus cannot determine which of the two nodes is transmitting the dominant 0 or the non-dominant 1 at any one time during the transmission sequence of the 0/1 bit followed by the logical complement, and only the two transmitting nodes do know which bit is being transmitted. The two nodes transmit the logical 0 and 1 bits and their logical complements in a randomized manner (if both nodes transmit a logical 00/11 sequence or logical 11/00 sequence then the transmission is ignored since those signals do enable third parties to determine the data transmitted from each node), which prevents other nodes connected to the CAN bus from detecting the identity of the node that transmits each bit. This operation, which is repeated many times and combined with other techniques that are not described in greater detail herein, forms the foundation to enable two nodes—and indirectly even larger groups of nodes—to exchange data that form the basis for shared cryptographic keys. After the nodes have exchanged cryptographic keys, those shared keys are used to perform data encryption and authentication/verification operations using techniques that are otherwise known to the art that enable different subsets of the nodes on the bus to exchange data that cannot be decrypted or altered in an undetectable manner by other nodes that are connected to the CAN bus.

As described above, nodes that are connected to the CAN bus with standard CAN bus transceivers can detect the voltage signals corresponding to logical 0 and 1 levels through the CANH and CANL wires of the CAN bus. When two nodes transmit a logical 0 and 1 simultaneously, the transceivers of most standard CAN nodes cannot determine which of the two nodes transmitted the logical 0 and 1. However, at a physical level the electrical signals that are transmitted through the CAN bus do not perfectly correspond to the logical 0 and 1 levels of digital logic that are described above because the physical components of the CAN bus and the nodes themselves have complex and different analog electrical properties. In some instances, an adversary, which is either a legitimate hardware node in the CAN bus that has been compromised by malicious software or an unauthorized hardware device that is electrically connected to the CAN bus, performs high-precision measurements of the properties of the electrical signals that are transmitted through the CAN bus in a manner that may enable the adversary to determine which node transmits the logical 0 and which node transmits the logical 1 signal in the process that is described above. In particular, since both nodes transmit a logical 0 and logical 1 in the randomized order for each bit exchange, the adversary can monitor signal characteristics of the dominant bit signal (the logical 0) that is transmitted from each node. The adversary can then reconstruct the secret data that is shared between the two nodes and compromise the security of the CAN bus system. This class of attacks is referred to as a side-channel attack because the adversary extracts information based on precise electrical signal measurements that are affected by the physical properties of the bus and the nodes that are connected to the bus in a particular CAN bus system even though the adversary has not defeated the logical protocol for cryptographic key exchange that is described above.

FIG. 1 depicts an example of a prior art CAN network 100 that includes three CAN nodes 104, 106, and 108 that are each connected to a CANH conductor 112 and CANL conductor 116 that are terminated by resistors 118 to form a CAN bus. The adversary node 124 is also electrically connected to the CAN bus and the adversary node includes electrical signal measurement and signal processing hardware that enables the adversary to perform one or more side-channel attacks. As described above, side-channel attacks present challenges to maintaining security in shared medium communication networks such as CAN bus. Consequently, improvements to methods and systems that reduce or eliminate the threats from these side-channel attacks would be beneficial.

SUMMARY

The embodiments described herein include methods to attack systems that utilize Plug-and-Secure for key agreement over the CAN bus and countermeasures to secure the system from adversaries that can physically probe the channel to perform the attacks. The new techniques allow obfuscation of the transient characteristics observed by an adversary with minimal circuit changes.

The advantages of the embodiments described herein include, but are not limited to, methods to utilize the transient characteristics to attack the CAN systems and extract a secret key and embodiments to protect CAN bus systems that perform cryptographic key exchange from the transient attacks. These embodiments include techniques such as utilization of the slope control mode, changing network characteristics, and modification of interconnects between passive impedance elements within a CAN bus system. The embodiments described herein can be implemented using hardware, software, and a combination of hardware and software. The embodiments described herein also enable CAN bus configurations that provide different levels of leakage reduction based on varying amounts of changes to the CAN controllers and network and varying degree of robustness.

In one embodiment, a method for operation of at least one node in a communication network has been developed. The method includes adjusting, with a controller in a first node, an impedance of a variable impedance circuit in the first node to a first impedance level that the controller in the first node determines randomly, the variable impedance circuit in the first node being connected to an output of a transceiver in the first node and to a shared communication medium, and transmitting, with the transceiver in the first node, a first data bit through the shared communication medium with the variable impedance circuit producing the first impedance level.

In another embodiment, a method for operation of at least one node in a communication network has been developed. The method includes adjusting, with a controller in a first node, a voltage slope of a transceiver in the first node to a first voltage slope value randomly selected within a predetermined range, and transmitting, with the transceiver in the first node, a first data bit through a shared communication medium with the voltage slope corresponding to the first voltage slope value.

DETAILED DESCRIPTION

Figure 1:
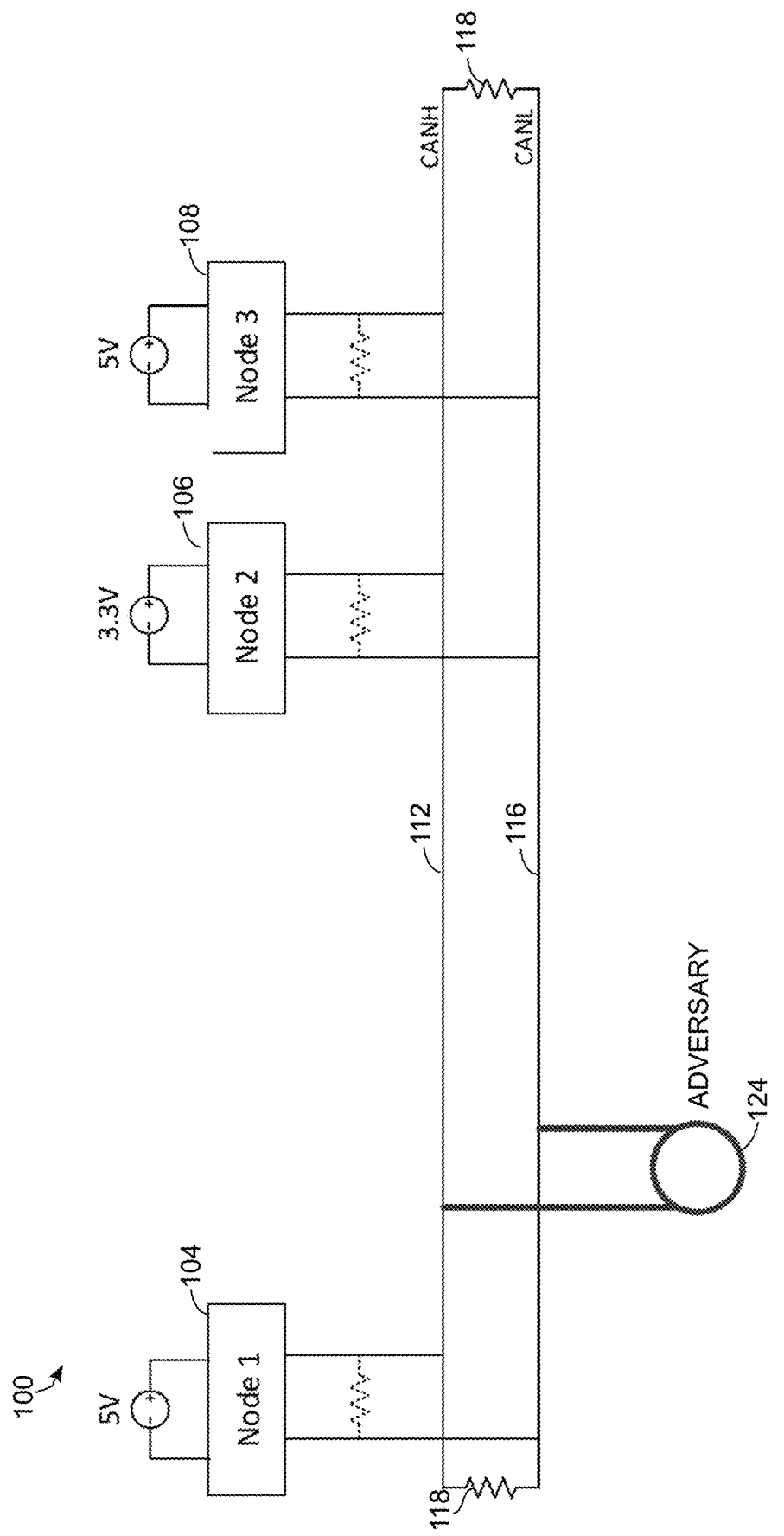
FIG. 1 is a diagram of a prior-art CAN bus system in which an adversary node measures electrical signals in the CAN bus to perform side-channel attacks.

For the purposes of promoting an understanding of the principles of the embodiments disclosed herein, reference is now be made to the drawings and descriptions in the following written specification. No limitation to the scope of the subject matter is intended by the references. This disclosure also includes any alterations and modifications to the illustrated embodiments and includes further applications of the principles of the disclosed embodiments as would normally occur to one skilled in the art to which this disclosure pertains.

As used herein, the term "bit" refers to a binary value that can have one of two discrete values, which are typically represented as a "0" or "1" in text. Communication systems generate signals with different voltage levels, phases, or other signal characteristics that represent the two values of a binary bit during transmission of data. As is well-known to the art, digital data includes a series of one or more bits that can represent numbers, letters, or any other form of data and, in particular, a set of bits can form a cryptographic key. As used herein, the terms "logical complement" or "inverse" as applied to binary values are interchangeable and refer to a set of data or an operation that changes the values of each bit of binary data (e.g. the binary sequence "101" is the logical complement of "010"). As described in more detail below, a protocol for secure key exchange leaves different nodes with sets of corresponding bits for shared keys that are logical complements of each other. Selected sets of the nodes perform an inversion operation so that all of the nodes have the same shared key.

As used herein, the term "key" or "cryptographic key" refers to a sequence of bits that two or more nodes in a communication network use to perform cryptographic operations including the encryption and decryption of data and for authentication of transmitted data. A "shared key" refers to a key that is known to two or more nodes that communicate with each other but the shared key is not otherwise known to third parties, including adversaries. The methods and systems described herein enable two or more nodes in a communication network to generate a shared key that an adversary cannot identify even if the adversary can monitor any communication that occurs between the nodes and is capable of performing the side-channel attacks that are described herein. After the shared keys are generated, the nodes perform cryptographic operations that are otherwise well-known to the art and are not described in greater detail herein.

As used herein, the term "shared communication medium" refers to a physical network connection and network communication protocol in which multiple nodes transmit and receive data in a manner where any transmission from a single node is received by all other nodes that are connected to the shared communication medium. In a shared communication medium, two or more nodes can transmit data simultaneously. The shared communication medium is considered an "insecure" or "untrusted" communication channel because an adversary is assumed to have the ability to monitor any and all communications that occur through the shared communication medium.

Two non-limiting examples of shared communication media include the Controller Area Network bus (CANbus) network communication bus and protocol and the I²C bus. In both of these embodiments, all nodes that are communicatively connected to the shared communication medium can observe all signals that are transmitted through the communication medium, including signals that are not intended for receipt by a particular node. As described in more detail below, each node is a computing device that includes a transceiver configured to both transmit and receive signals through the shared communication medium to one or more additional nodes.

One class of side-channel attack is referred to in this document as a "transient based" side-channel attack that extracts information based on the characteristics of transitions between logical 0 and 1 signals that are transmitted by different nodes in the CAN bus. An adversary, such as the adversary 124 in FIG. 1, that is capable of observing the variation of CAN bus signals with sufficiently high voltage precision and timing resolution can, in an unprotected system, differentiate between the transmitter of the logical '0' and '1'. Such an adversary can be simply realized by an eavesdropper who accesses the wires directly using a high precision oscilloscope (digital or analog). An alternate means could be through an regular node connected to the CAN bus with a high precision analog-to-digital (A/D) converter at the input with a modified CAN controller capable of sampling the bus at a high frequency. For example, in automotive scenarios (or general systems), such nodes can be connected to the OBD-II port (diagnostics port). A representation of the CAN bus with adversarial presence is illustrated in FIG. 1.

In the CAN bus standard, when transmitting the dominant bit '0' on the bus, the output pins CANH and CANL are driven to different voltage levels, and the difference from CANH to CANL is the output of the CAN bus. Similarly, transmission of a recessive bit '1' occurs when CANH and CANL are not driven and will have similar voltage levels. Similar to typical electrical systems, the physical medium of the CAN bus has a non-negligible capacitance and inductance that influences the signal as it propagates. This influence, for signals transmitted by different nodes, may be non-uniform. Thus, the signal transitions that a node transmits via the CAN Bus may exhibit different transient characteristics as the signal changes between the voltage levels that correspond to the dominant 0 bit and the recessive 1 bit. The sample point of a typical bit is sufficiently delayed to ensure that the CAN bus is robust to such transient phenomenon for normal operation, but in at least some scenarios the adversary may be able to make precise measurements of the differences in transient signals from different nodes to enable the adversary to uniquely identify the nodes that transmit signals based on the transients even if two nodes transmit signals simultaneously.

Figure 2:
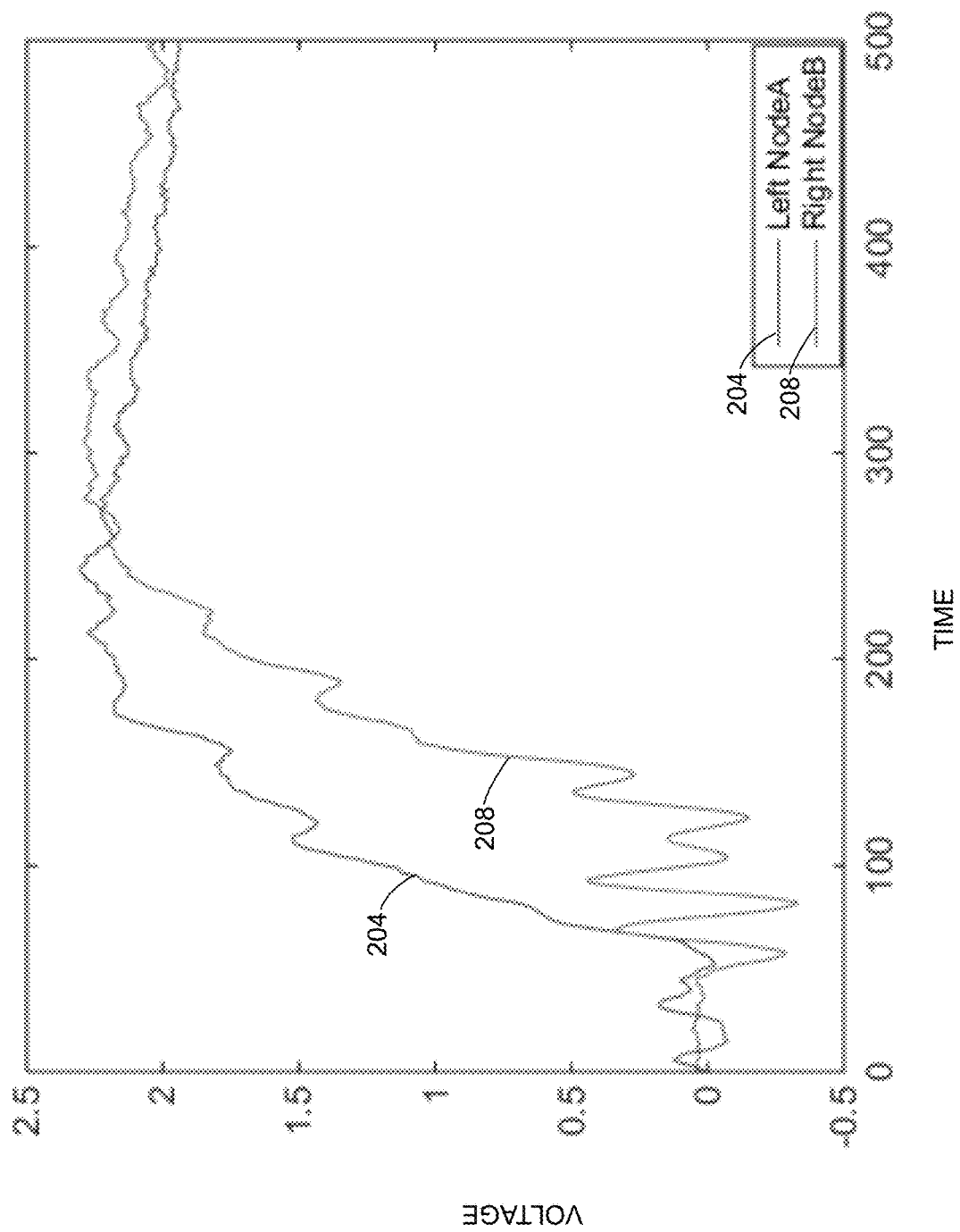
FIG. 2 is a diagram of transient signals generated by two nodes in a CAN network.

FIG. 2 depicts a diagram of voltage levels over time that are measured for transient signals generated by two different nodes that generate the signals 204 and 208 in a prior art CAN bus. In the diagram of FIG. 2 both of the nodes begin transmitting the signals 204 and 208 simultaneously. The two nodes are of the same manufacturer family and model, but an adversary that is connected to the CAN bus can still observe small differences in the transient signals emitted by the two nodes. Even an adversary that is located symmetrically in distance between the two transmitters, where the time of signal propagation and clock synchronization differences between the two nodes is effectively identical and timing-based side-channel attacks are difficult to perform, may observe different resistance-inductance-capacitance (RLC) parameters in the signal paths that enables the adversary node to distinguish the identity of the node that transmits each signal. As depicted in FIG. 2, the recessive to dominant transmission for both the transmitters can be clearly distinguished, based on simple time domain characteristics such as the rise time. Thus an adversary observing the bus with sufficiently high temporal resolution can easily distinguish between the transitions of the left node (e.g. node 104 in FIG. 1) and the right node (e.g. node 108 in FIG. 1) based on the signals 204 and 208, respectively.

The adversary node typically observes a large number of signal transmissions from different nodes over time during normal operation of the CAN bus system to enable the adversary node to identify signals from different nodes uniquely even when two nodes transmit signals simultaneously. For improved accuracy, an adversary may utilize several time domain and frequency domain features such as standard deviation, skewness, centroid, kurtosis, irregularity, flatness, smoothness. Several of these features may be utilized to demonstrate identification of nodes with very high accuracy. In a practical scenario, an adversary would not have any prior information about node characteristics and could first observe regular transitions on the bus to learn the partitions of the observation space for different nodes. A secondary source of information could further assign particular nodes to the partitions. In the absence of such information, an adversary could group the transmissions from individual nodes and decode an arbitrarily long sequence to the accuracy of 1-bit entropy.

The information leakage described above occurs due to differences in the impedance characteristics, driver circuit and noise characteristics between different transmitters to a common observation point of the adversary node. Since such characteristics are a function of not just the network topology, but the physical characteristics of the components used to build the network, it would be difficult to model and equalize such influences during design time. However, the view of the adversary can be distorted by sufficiently modifying the bus characteristics so that successive transitions for the same node appear to be different to the adversary node, which prevents the adversary node from being able to reliably identify which node transmits a logical 0 or logical 1 signal based on the transient signals when two nodes transmit simultaneously.

Figure 3:
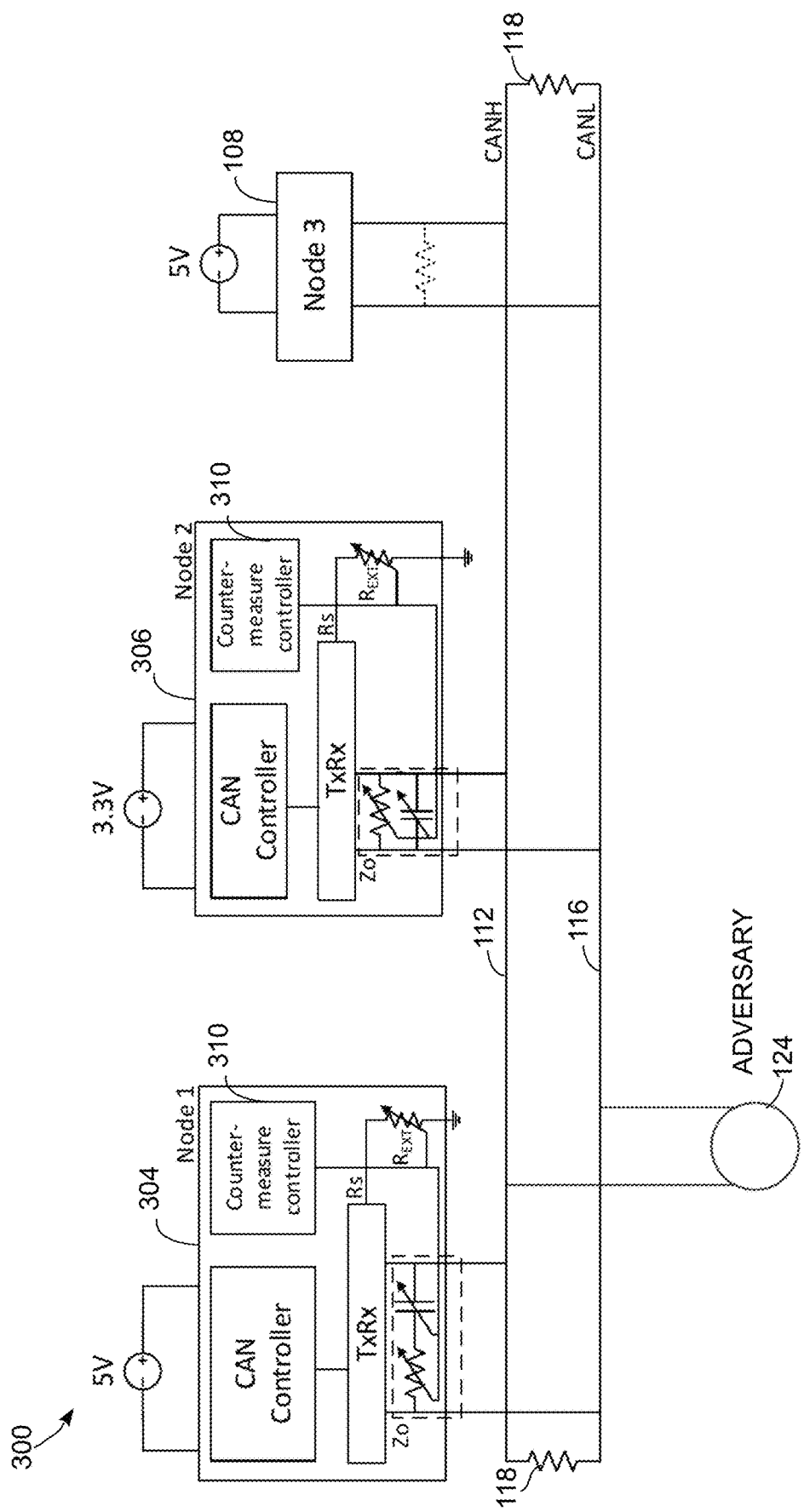
FIG. 3 is a diagram of a CAN bus system that includes nodes configured to adjust the slope of transient signals and the load impedance to prevent an adversary from performing side-channel attacks based on transient signal characteristics.

FIG. 3 is a schematic diagram of a CAN bus system 300 which includes nodes that are specifically configured to reduce or eliminate the ability of an adversary to perform the side-channel attacks based on transient signals that are described above. The system 300 includes nodes 304 and 306 that each include a countermeasure controller 310 that is operatively connected to a variable resistor (potentiometer) $R_{EXT}$, and a variable impedance circuit Zo that includes an RC circuit with a potentiometer connected to a variable capacitor connected in series (node 304) or in parallel (node 306). As is described in further detail below, the potentiometer $R_{EXT}$ is one embodiment of a device that is used to adjust the voltage slope of output signals from the transceiver. The variable impedance circuits Zo are connected to outputs of the transceiver and the CAN bus lines 112 and 116 to adjust the level of load impedance. The adjustments to the voltage slope and the load impedance each affect the output signals that are transmitted from the transceiver (TxRx) in the nodes 304 and 306 in a manner that prevents the adversary 124 from being able to reliably distinguish between the nodes 304 and 306 based on the transient signals produced when both nodes transmit data simultaneously.

In the embodiment of FIG. 3, the countermeasure controller 310 is a digital logic device that is operatively connected to the potentiometer $R_{EXT}$ and the potentiometer and variable capacitor in the variable impedance circuit Zo. The countermeasure controller 310 implements at least one of a hardware random number generator (RNG) or a pseudo-random number generator that provides randomized data. The countermeasure controller 310 produces random data using a predetermined random distribution, which is a uniform random distribution in the embodiment of FIG. 3 although other distributions may be used, and the random numbers are generated independently of each other so that the value of each randomly generated number is not affected by the values of previously generated random numbers. The countermeasure controller 310 uses the randomized data to generate control output signals to adjust $R_{EXT}$ to adjust a voltage slope of the transceiver and variable impedance circuit Zo to adjust the level of the load impedance presented to the output of the transceiver where each adjustment is performed randomly and independently in a manner that an adversary node cannot predict. The potentiometers and variable capacitor circuits in nodes 304 and 306 include digital potentiometer and variable capacitor components that can be controlled by output signals from the countermeasure controller circuit and are adjusted at a high rate of speed to enable efficient operation in the CAN bus system 300. While FIG. 3 depicts the countermeasure controller 310 as a separate device for illustrative purposes, in some embodiments the countermeasure controller is implemented using hardware and software in the CAN controller or another digital logic device in each of the nodes 304 and 306.

The system 300 also includes the CANH conductor 112, CANL conductor 116, terminating resistors 118 that form the same shared communication medium that is depicted above in FIG. 1. The system 300 also depicts the adversary node 124 that is connected to the CAN Bus conductors 112 and 116 between the nodes 304 and 306. Furthermore, the system 300 depicts one of the prior art CAN Bus nodes 108 that is also depicted in FIG. 1 for illustrative purposes because the nodes 304 and 306 remain fully compatible with existing CAN bus nodes and because in at least some embodiments the operation of the nodes 304 and 306 also reduces the ability of the adversary node 124 to perform side-channel attacks against the prior art node 108 because the nodes 304 and 306 can introduce random changes in impedance to the entire CAN bus.

Figure 4:
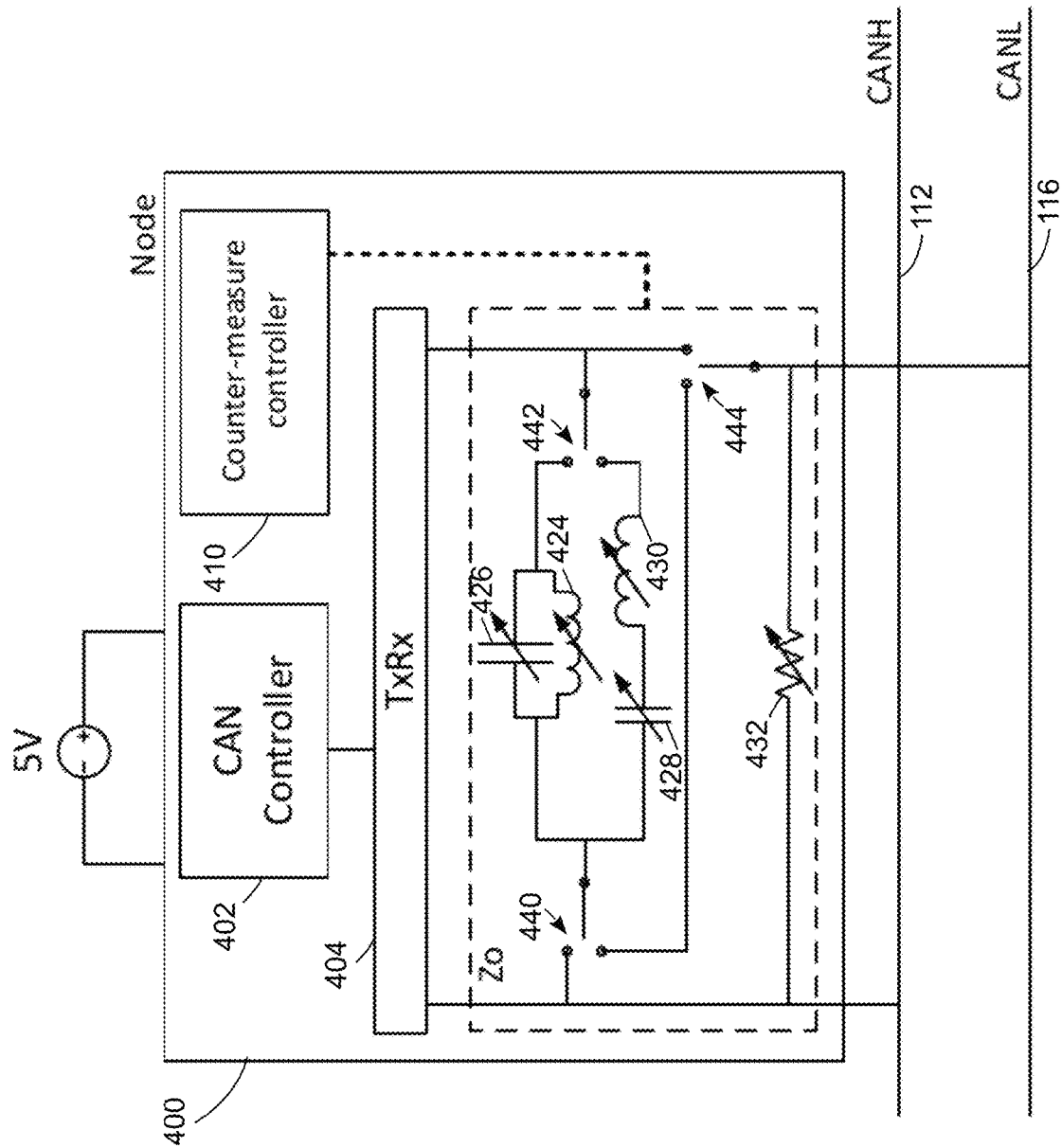
FIG. 4 is a diagram of a node in a CAN bus system that is configured to adjust load impedance to prevent an adversary from performing side-channel attacks based on transient signal characteristics.

FIG. 4 is a schematic diagram that depicts another embodiment of a node 400 that includes a countermeasure controller that is operatively connected to multiple resistor-inductor-capacitor (RLC) circuit configurations within a variable impedance circuit Zo in more detail. In FIG. 4 the node 400 includes a CAN Bus controller 402 and a transceiver circuit (TxRx) 404. The node 400 also includes the countermeasure controller 410 that has a similar structure to the countermeasure controller 310 described above. The node 400 includes a variable impedance circuit Zo. The countermeasure controller 410 is operatively connected to the variable impedance circuit Zo and is configured to operate the variable impedance circuit Zo to produce randomized changes to the effective load impedance that the CAN bus conductors 112 and 116 present to the outputs of the transceiver 404. In the node 400, the variable impedance circuit Zo includes two different inductor-capacitor (LC) circuit configurations including a parallel connection between a variable inductor 424 and a variable capacitor 426 and a series connection between a variable capacitor 428 and a variable inductor 430. The variable impedance circuit Zo also includes a potentiometer 432 that is connected in parallel with the LC circuits to form an RLC circuit. The countermeasure controller 410 is operatively connected to each of the variable inductors 424/430, variable capacitors 426/428, and the potentiometer 432, and each of these components is configured to be operated by control signals from the countermeasure controller 410 at high speed to enable efficient operation of the node 400 in a CAN Bus system. The countermeasure controller 410 randomly adjusts the capacitance and inductance levels in the LC circuits and the resistance level of the potentiometer 432 to adjust the level of impedance for different bits that the node 400 transmits via the CAN bus. The variable impedance circuit Zo includes switches 440, 442, and 444, which are implemented as solid state switching devices in the embodiment of FIG. 4. The switches 440 and 442 control which of the LC circuits is connected to the outputs of the transceiver 404.

During operation, the countermeasure controller 410 generates random control data to operate the switches 440 and 442 to select either the parallel LC circuit (inductor 424, capacitor 426) or the series LC circuit (capacitor 428, inductor 430) prior to transmitting a bit of data. The countermeasure controller 410 also generates randomized control signals to produce randomized inductance and capacitance values in the selected LC circuit and a randomized resistance value in the potentiometer 432. The randomly configured RLC circuit, which includes either a series or parallel LC circuit with the resistor and randomized RLC values, affects the transient output signal from the transceiver 404 as the node 404 transmits a bit of data via the CAN bus. While not depicted in FIG. 4, the node 400 can also incorporate the $R_{EXT}$ potentiometer that is depicted in the nodes 304 and 306 of FIG. 3 as an input to the transceiver 404 to control a voltage slope of the transceiver 404.

The countermeasure controller 410 is also configured to operate the switches 440, 442, and 444 to bypass the entire variable impedance circuit Zo during normal operation when the node 400 transmits data that is not intended to be hidden from other nodes in the CAN bus, including the adversary. Such data can be unencrypted data or data that are encrypted after the node 400 has used the variable impedance circuit Zo to obfuscate the transient signal output from the node 400 during a cryptographic key exchange process in which the node 400 transmits data simultaneously with another node that is connected to the CAN bus. An adversary node in the CAN bus cannot observe the effects of the variable impedance circuit Zo on the transient signals from the node 400 during normal operation when the node 400 is the only device that transmits data through the CAN bus, which provides additional security to the CAN bus system.

Voltage Slope Control

One embodiment of a method that is performed using the node of the embodiments of FIG. 3 and FIG. 4 adjusts a voltage slope of the transceiver in the node randomly to prevent an adversary from being able to identify a node based on transient signal characteristics. Some CAN transceiver circuit embodiments support a slope-control mode that allows modification of the rise and fall times of signal transitions, with the goal of reducing electromagnetic interference (EMI) in the CAN bus. This is typically adjusted to ensure sufficient robustness at the highest speed of operation. However, modifications of the rise and fall times also alter the transient behavior of a node. Thus, the embodiments described herein utilize the slope control to obfuscate the adversarial observation by provisioning the node with the ability change the slope control mode dynamically and unpredictably during operation.

Figure 5:
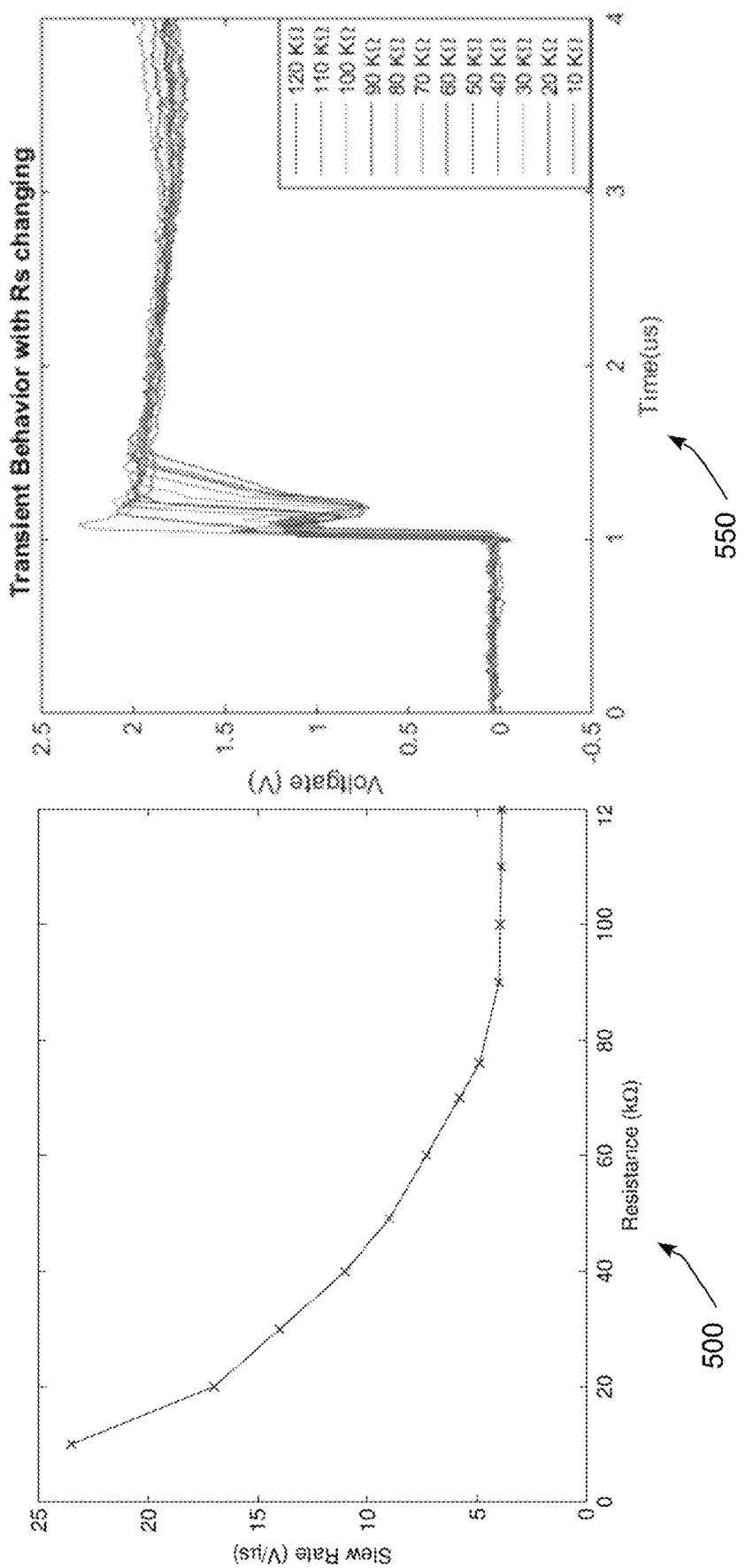
FIG. 5 is a diagram depicting the relationship between voltage slope and an external resistance for an embodiment of a CAN bus transceiver and a diagram depicting transient signals generated using different voltage slope settings.

One example of a CAN Bus transceiver chip that is commercially available is the MCP2551, although the techniques described herein can be applied to other CAN Bus transceiver embodiments. FIG. 5 depicts a diagram of the slope of a transmission signal from the transceiver, which is measured as a change in voltage per microsecond, in response to the resistance level of a control resistor for the MCP2551. In the embodiments described above, the potentiometer $R_{EXT}$ is connected to an input to the transceiver, which is the slope pin $R_S$ depicted in FIG. 3. The countermeasure controller 310 sets the potentiometer $R_{EXT}$ to produce one of the resistance levels that are depicted in the diagram 500 to adjust the voltage slope of the transceiver within the operational range of the transceiver in a random manner both prior to transmission of each data bit or during the transmission of the data bit from the transceiver. Since the variation of slew rate as a function of $R_{EXT}$ is different for each node based on the type of transceiver, the countermeasure controller each node includes or is connected to a memory device that stores a predetermined mapping that characterizes such variations. Such a profile can be established and programmed by the manufacturer during the manufacture or testing phase. Alternatively, a small calibration phase after system assembly can be used to characterize and record such a mapping after the node has been installed in the system network. Calibrating the slope to resistance profiles improves accuracy because the slope response is also partially affected by the network load and impedance levels in the CAN Bus, which varies based on the parameters of the CAN Bus and all of the other nodes that are attached to the CAN Bus.

FIG. 5 also depicts a voltage versus time graph 550 of the transient output signals that are measured from one MCP2551. As depicted in the graph 550, the transient output signals depict substantial changes over a range of resistance levels for $R_{EXT}$ from 10 KΩ to 120 KΩ as the transceiver varies the rate of voltage change due to different slope control resistance settings. While FIG. 5 depicts twelve different slope settings for illustrative purposes, the countermeasure controller can select from a much larger number of slope settings by varying the value of $R_{EXT}$ between the minimum and maximum resistance range for control of the voltage slope of the transceiver. Let D denote a distribution over the set $[R_{EXT}^{MIN}, R_{EXT}^{MAX}]$ corresponding to the minimum and maximum practical operational values of $R_{EXT}$ where the countermeasure controller selects resistance values to produce a uniformly random distribution F of transient features by adjusting the slope settings. Such a distribution may be determined by a node with knowledge of the mapping between $R_{EXT}$ and the transient response, which is often non-linear. The goal is to generate randomized transient responses, so the countermeasure controller 310 maps the uniformly randomly generated data from the random number generator to the non-linear distribution of transient signals so that the transient signals are varied in a uniformly random manner. The mapping is determined empirically based on the signal characteristics of each CAN bus transceiver and can be stored in a memory within each node. In another embodiment, the random number generator in the countermeasure controller 310 is modified to produce random numbers with a non-uniform distribution that corresponds to the specific transient signal characteristics of the transceiver. However, an observer in a practical scenario, such as the adversary 124, the observed transients are a function of the observer location, and thus distribution of features F may not be uniform for values sampled using the distribution D. Further, in the absence of any additional knowledge, the countermeasure controller may simply choose D to be a uniform distribution over $[R_{EXT}^{MIN}, R_{EXT}^{MAX}]$.

For each bit transmission, a given node i adjusts the slope-control resistor based on the value sampled from D. For example, the countermeasure controller generates a first random value, adjusts the resistor Rext to adjust the voltage slope of the transceiver to a first random value in the predetermined voltage slope range of the transceiver, and the transceiver transmits a first bit of data using the voltage slope corresponding to the first value. The process then repeats to enable the node to transmit a second bit with another randomly selected value, which could be the same or different than the first randomly selected value and cannot be predicted by the adversary node. This process decreases leakage by obfuscating the view of the adversary node. It should be noted that the leakage is dependent on ability of the adversary node to differentiate between the transmissions from the active transmitters. Thus it is dependent on the statistical distance between the distribution of feature sets, i.e. $D_i^F$, $D_j^F$ corresponding to the transients from nodes i and j. Without apriori knowledge of the adversary node position in the CAN Bus, it may not be feasible to reduce this distance to 0. Thus, intuitively each node, in isolation, attempts to make the distributions close to uniform.

Variation of Load Impedance

In another embodiment, the countermeasure controller in a node of the CAN bus randomly adjusts the load impedance that is connected to the output of the transceiver in the node to change the transient features of the transmitted signal in an unpredictable manner to reduce or eliminate the ability of an adversary node to determine the identity of transmitting nodes during the shared key distribution processes that are described above. The transients due to changes in the node state are a function of the effective impedance of the transmission medium, i.e. the equivalent impedance between the adversarial observer and the transmitter. Thus any variation in the impedance levels in the variable impedance circuit produces changes to the transient characteristics.

Figure 6:
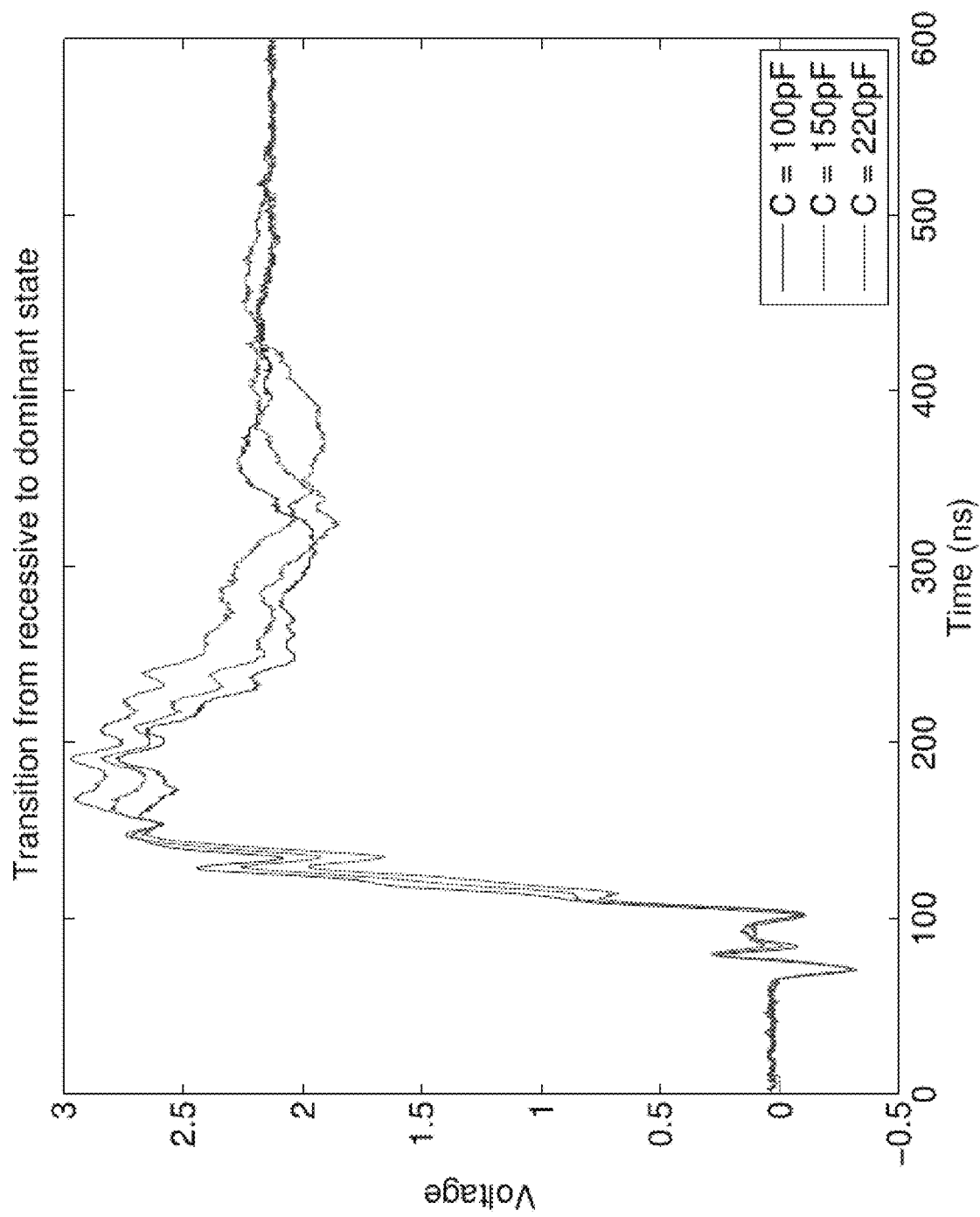
FIG. 6 is a diagram depicting transient signals produced by a CAN bus transceiver with varying load impedance levels.

To introduce noise into the transient features of transmitted signals, the nodes described above in FIG. 3 and FIG. 4 randomly adjust at least one of a capacitive and inductive component in addition to randomly adjusting a resistive component in the variable impedance circuits Zo to add additional noise for the adversary. The random adjustment occurs prior to transmitting each bit and optionally occurs one or more times while the bit is being transmitted. FIG. 6, depicts the variation of transients of a node for different value of load capacitance that can be produced using the variable impedance circuits Zo including the RC circuits in the nodes 304 and 306 of FIG. 3 and the RLC circuits of the node 400 in FIG. 4.

Referring to the system 300 of FIG. 3, the individual nodes 304 and 306 can perform impedance variation, where each node is equipped with the capability to modify impedance. The modification of the load impedance in each of the nodes 304 and 306 in a random manner introduces noise into the transient signals that are transmitted from each of the nodes 304 and 306, which reduces or eliminates the ability of the adversary node 124 to determine which of the nodes 304 and 306 transmits a logical 0 or 1 bit when both nodes transmit simultaneously to perform cryptographic key exchange as is described above. In addition to these architectures, the RLC components of the impedance may be connected in different topologies to achieve different effect on the transient component. Two example configurations, using parallel and series combination of the resistive and capacitive load is illustrated in the nodes 304 and 306 of FIG. 3. Furthermore, the embodiment of FIG. 4 includes a single node 400 that can switch between the series LC and parallel LC circuits in a random manner in addition to adjusting the individual RLC element values randomly prior to transmitting each bit of data and optionally one or more additional times during the transmission of each bit. Each configuration with the same components behaves as a filter with different frequency rejection ranges, and thus influences the transients differently. For each node the variable configurations may be implemented by using digitally controlled switches, as depicted in the node 400.

In another confirmation, the nodes 304 and 306 perform a group impedance variation, where only a subset of nodes, which are referred to as "jammer nodes" adjust the impedance level of the bus. The jammer nodes can affect the impedance of the CAN bus even if the jammer nodes are not actively transmitting data by randomly adjusting the load impedance values in the circuits Zo that are connected to the CANH conductor 112 and CANL conductor 116. A system configuration that uses jammer nodes can at least partially reduce the ability of the adversary node 124 to determine the identity of transmitting nodes even if the transmitting nodes do not include the specific countermeasure controllers, load impedance circuits, and slope adjustment circuits that are described herein. For example, in the system 300 the nodes 304 and 306 operate as jammers to randomly adjust the load impedance levels on the CAN bus conductors 112 and 116. The operation of the nodes 304 and 306 also reduces the ability of the adversary 124 to determine the bit that is transmitted from the prior art node 108 when the node 108 transmits data bits simultaneously with either of the nodes 304, 306, or another node that is connected to the CAN bus to perform cryptographic key exchange.

For example, in the node 304 the countermeasure controller 310 adjusts the impedance of the variable impedance circuit Zo to a second impedance level, or a wide range of impedance levels, that the controller in the first node determines randomly and independently of the other randomly generated impedance levels to adjust an impedance level of the CAN Bus while two other nodes including the node 108 and any other node including the node 306 that is connected to the CAN Bus performs the cryptographic key exchange operation. The node 304 adjusts the impedance randomly at a high frequency and does not have to be synchronized with the operation of the other nodes that are performing the cryptographic key exchange operation. Furthermore, multiple nodes such as both of nodes 304 and 306 can operate simultaneously to adjust the impedance level at random. Using the jammer nodes to introduce random changes into the impedance level of the CAN bus enables one or a small number of nodes with the variable impedance circuits Zo to reduce the effectiveness of the side-channel attacks even when many nodes that are connected to the CAN Bus lack the variable impedance circuits Zo or other side-channel attack mitigation hardware and software elements.

FIG. 6 depicts the effects of changes in capacitance levels in an impedance control circuit Zo that affect the impedance level value of the load impedance at the outputs of the transceiver in a node that is connected to a CAN bus. While FIG. 6 depicts three capacitance values, the countermeasure controller and the variable impedance circuit Zo can produce a large number of different capacitance levels to adjust the impedance level. Additionally, the countermeasure controller also adjusts the resistance level of the potentiometer in the variable impedance circuit Zo randomly to further adjust the impedance level and the transmitted signal transient features randomly. In the embodiment of FIG. 4, the controller also adjusts the inductance level of the variable inductor to in the variable impedance circuit Zo randomly to further adjust the impedance level and the transmitted signal transient features randomly. As described above, the countermeasure controller randomly adjusts resistance, capacitance, and inductance elements in the various embodiments of the variable impedance circuit Zo to generate different transient signals, such as those depicted in FIG. 6, in an unpredictable manner.

As depicted in FIG. 3 and FIG. 4, some embodiments of nodes in a CAN Bus system use the voltage slope control techniques, the variation of load impedance techniques, or a combination of both techniques to reduce or eliminate the ability of the adversarial node to identify which node transmits a signal corresponding to a logical 0 or 1 when the two nodes transmit the signals simultaneously based on the transient characteristics of the transmitted signals. For example, two nodes that communicate with each other, such as the nodes 304 and 306 of FIG. 3, can use both techniques simultaneously. In another configuration, one node uses the slope control technique while the other node uses the load impedance control technique to introduce noise into the transient signal features and reduce or eliminate the ability of the adversary node 124 to perform side-channel attacks. In still another configuration, one node uses either or both of the voltage slope control and variation of load impedance techniques while the other node uses neither technique, which may occur if the other node is a prior art node such as the node 108.

The embodiments described herein propose new methods to attack and protect CAN based systems that utilize simultaneous transmissions between nodes that are connected to the CAN bus to share data for cryptographic key agreement. The proposed techniques protect against adversaries that can physically probe the system using high resolution equipment and utilize transient characteristics. Example systems that can use the embodiments described herein include, but are not limited to, automotive systems (cars, buses, trucks, farm equipment, trains), industrial machines, control panels for DC-electrical power distribution systems, and security systems using the CAN bus. The embodiments described herein illustrate the threat of side-channel attacks based on transient based features. The embodiments described herein also provide methods and systems that enable nodes in a communication network to add controlled noise to the adversary observations and minimize information leakage, which provides a technological improvement to the security of operation of shared communication medium networks including CAN Bus. One embodiment utilizes the dependence of the transients on network impedance. A controller systematically varies the bus impedance over time, by changing the RLC values, to modify the transient response that the adversary observes on the bus. Another embodiment utilizes the difference in transients due to different configurations of the same RLC elements. A controller is proposed that can systematically select different configurations to modify the transient response observed by the adversary. Another embodiment utilizes the slope-control mode with varying slew rate to modify the transients observed by the adversary. The embodiments described herein can be used individually or in combination in nodes of a communication network to reduce or eliminate the ability of an adversary to perform transient based side-channel attacks.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for operation of at least one node in a communication network comprising:
    adjusting, with a controller in a first node, an impedance of a variable impedance circuit in the first node to a first impedance level that the controller in the first node determines randomly, the variable impedance circuit in the first node being connected to an output of a transceiver in the first node and to a shared communication medium; and
    transmitting, with the transceiver in the first node, a first data bit through the shared communication medium with the variable impedance circuit producing the first impedance level.

2. The method of claim 1 further comprising:
    adjusting, with the controller in the first node, the impedance of the variable impedance circuit in the first node to a second impedance level that the controller determines randomly, the second impedance level being determined independently from the first impedance level; and
    transmitting, with the transceiver in the first node, a second data bit through the shared communication medium with the variable impedance circuit producing the second impedance level.

3. The method of claim 1, the adjusting of the impedance further comprising:
    adjusting, with the controller in the first node, a resistance level of a potentiometer in the variable impedance circuit to a resistance level that the controller determines randomly;
    adjusting, with the controller in the first node, a capacitance level of a variable capacitor in the variable impedance circuit to a capacitance level that the controller determines randomly.

4. The method of claim 3, wherein the variable impedance circuit produces the first impedance level with a series connection of the potentiometer and the capacitor.

5. The method of claim 3, wherein the variable impedance circuit produces the first impedance level with a parallel connection of the potentiometer and the capacitor.

6. The method of claim 1, the adjusting of the impedance further comprising:
    adjusting, with the controller in the first node, a resistance level of a potentiometer in the variable impedance circuit to a resistance level that the controller determines randomly;
    adjusting, with the controller in the first node, a capacitance level of a variable capacitor in the variable impedance circuit to a capacitance level that the controller determines randomly; and
    adjusting, with the controller in the first node, an inductance level of a variable inductor in the variable impedance circuit to an inductance level that the controller determines randomly.

7. The method of claim 6, the adjusting of the impedance further comprising:
    operating, with the controller in the first node, at least one switch to select the variable capacitor and the variable conductor in one of a series inductor-capacitor configuration or a parallel inductor-capacitor configuration randomly.

8. The method of claim 1, the transmitting further comprising:
    transmitting, with the transceiver in the first node, the first data bit through a controller area network (CAN) bus shared communication medium with the variable impedance circuit producing the first impedance level.

9. The method of claim 1 further comprising:
    adjusting, with a controller in a second node, an impedance of a variable impedance circuit in the second node to a second impedance level that the controller in the second node determines randomly, the variable impedance circuit in the second node being connected to an output of a transceiver in the second node and to the shared communication medium; and
    transmitting, with the transceiver in the second node, a second data bit through the shared communication medium with the variable impedance circuit producing the second impedance level, the transmitting of the second data bit occurring simultaneously to the transmission of the first data bit from the first node to prevent an adversary node that is connected to the shared communication medium from determining that the first node transmitted the first bit and the second node transmitted the second bit through the shared communication medium.

10. The method of claim 1 further comprising:
    adjusting, with a controller in a second node, a voltage slope of a transceiver in the second node to a first voltage slope value randomly selected within a predetermined range; and
    transmitting, with the transceiver in the second node, a second data bit through the shared communication medium with the voltage slope corresponding to the first voltage slope value, the transmitting of the second data bit occurring simultaneously to the transmission of the first data bit from the first node to prevent an adversary node that is connected to the shared communication medium from determining that the first node transmitted the first bit and the second node transmitted the second bit through the shared communication medium.

11. The method of claim 1 further comprising:
    adjusting, with the controller in the first node, the impedance of the variable impedance circuit in the first node to a second impedance level that the controller in the first node determines randomly, the second impedance level being determined independently from the first resistance level, to adjust an impedance level of the shared communication medium while a second node that is connected to the shared communication medium transmits a second bit of data simultaneously to a third node that is connected to the shared communication medium transmitting a third bit of data to prevent an adversary node that is connected to the shared communication medium from determining which of the second node and the third node transmitted the second bit of data and the third bit of data.

12. The method of claim 1 further comprising:
adjusting, with the controller in the first node, the impedance of the variable impedance circuit in the first node to a second impedance level that the controller determines randomly, the second impedance level being determined independently from the first impedance level, during the transmitting of the first bit.

13. The method of claim 1, wherein the shared communication medium includes two conductors and the variable impedance circuit is connected between the two conductors at the output of the transceiver in the first node.

14. A method for operation of at least one node in a communication network comprising:
adjusting, with a controller in a first node, a voltage slope of a transceiver in the first node to a first voltage slope value randomly selected within a predetermined range; and
transmitting, with the transceiver in the first node, a first data bit through a shared communication medium with the voltage slope corresponding to the first voltage slope value.

15. The method of claim 14 further comprising:
adjusting, with the controller in the first node, the voltage slope of the transceiver in the node to a second slope value randomly selected within the predetermined range, the second voltage slope value being different than the first voltage slope value; and
transmitting, with the transceiver in the first node, a second data bit through the shared communication medium with the voltage slope corresponding to the second voltage slope value.

16. The method of claim 14, the adjusting of the voltage slope further comprising:
adjusting, with the controller in the first node, a resistance value of a potentiometer in the first node connected to the transceiver in the first node to adjust the voltage slope of the transceiver to the first voltage slope value.

17. The method of claim 14 further comprising:
adjusting, with a controller in a second node, a voltage slope of a transceiver in the second node to a second voltage slope value randomly selected within the predetermined range; and
transmitting, with the transceiver in the second node, a second data bit through the shared communication medium with the voltage slope corresponding to the second voltage slope value, the transmitting of the second data bit occurring simultaneously to the transmission of the first data bit from the first node to prevent an adversary node that is connected to the shared communication medium from determining that the first node transmitted the first bit and the second node transmitted the second bit through the shared communication medium.

18. The method of claim 14 further comprising:
adjusting, with a controller in a second node, an impedance of a variable impedance circuit in the second node to a first impedance level that the controller in the second node determines randomly, the variable impedance circuit in the second node being connected to an output of a transceiver in the second node and to the shared communication medium; and
transmitting, with the transceiver in the second node, a second data bit through the shared communication medium with the variable impedance circuit producing the first impedance level, the transmitting of the second data bit occurring simultaneously to the transmission of the first data bit from the first node to prevent an adversary node that is connected to the shared communication medium from determining that the first node transmitted the first bit and the second node transmitted the second bit through the shared communication medium.

19. The method of claim 14, the transmitting further comprising:
transmitting, with the transceiver in the first node, the first data bit through a controller area network (CAN) bus shared communication medium with the voltage slope corresponding to the first voltage slope value.

* * * * *